United States Patent
Potin et al.

(10) Patent No.: US 6,788,442 B1
(45) Date of Patent: Sep. 7, 2004

(54) OPTICAL DEVICE FOR HELMET VISOR COMPRISING A DIFFRACTIVE MIRROR

(75) Inventors: Laurent Potin, Bordeaux (FR); Laurent Bignolles, Bordeaux (FR)

(73) Assignee: Thomson-CSF Sexant, Velizy Villacoublay (FR)

( * ) Notice: Subject to any disclaimer, the term of this patent is extended or adjusted under 35 U.S.C. 154(b) by 0 days.

(21) Appl. No.: 09/806,936

(22) PCT Filed: Oct. 5, 1999

(86) PCT No.: PCT/FR99/02378

§ 371 (c)(1),
(2), (4) Date: Apr. 6, 2001

(87) PCT Pub. No.: WO00/20913

PCT Pub. Date: Apr. 13, 2000

(30) Foreign Application Priority Data

Oct. 6, 1998 (FR) .............................. 98/12499

(51) Int. Cl.[7] ................................ G03H 1/00
(52) U.S. Cl. ................. 359/13; 359/16; 345/8
(58) Field of Search .............. 359/13, 14, 16, 359/19, 630, 631, 364, 365, 730, 857, 858; 345/7, 8

(56) References Cited

U.S. PATENT DOCUMENTS

| | | | |
|---|---|---|---|
| 4,582,389 A | 4/1986 | Wood et al. .................. 359/14 |
| 4,763,990 A | * 8/1988 | Wood ............................ 345/7 |
| 5,436,763 A | * 7/1995 | Chen et al. .................. 359/565 |
| 5,467,480 A | 11/1995 | Baudou et al. ................. 2/6.5 |
| 5,479,294 A | 12/1995 | Darrieux et al. ............ 359/630 |
| 5,517,337 A | 5/1996 | Dupin et al. .................. 359/13 |
| 5,581,806 A | 12/1996 | Capdepuy et al. .............. 2/6.2 |
| 5,623,730 A | 4/1997 | Baudou et al. ................. 2/6.2 |
| 5,684,634 A | * 11/1997 | Rogers ........................ 359/630 |
| 5,742,937 A | 4/1998 | Baudou et al. ................. 2/6.3 |
| 6,014,769 A | 1/2000 | Baudou et al. ................. 2/6.1 |
| 6,078,428 A | 6/2000 | Rambert et al. ............ 359/632 |
| 6,157,471 A | 12/2000 | Bignolles et al. ............. 359/15 |
| 6,158,866 A | 12/2000 | Gulli et al. ................. 351/221 |

FOREIGN PATENT DOCUMENTS

| | | |
|---|---|---|
| EP | 0 151 455 | 8/1985 |
| EP | 0 216 692 | 4/1987 |
| EP | 0 286 496 | 10/1988 |
| EP | 0 288 365 | 10/1988 |
| EP | 0 463 888 | 1/1992 |
| EP | 0 794 448 | 9/1997 |
| FR | 2 411 436 | 7/1979 |
| FR | 2 593 932 | 8/1987 |
| WO | WO 87/01211 | 2/1987 |
| WO | WO 88/05553 | 7/1988 |
| WO | WO 89/03059 | 4/1989 |
| WO | WO 94/18596 | 8/1994 |

OTHER PUBLICATIONS

Hecht, Eugene. Optics. Massachusetts, Addison Wesley Longman, 1998, p. 267, 269.*

* cited by examiner

*Primary Examiner*—Mark A. Robinson
*Assistant Examiner*—Alessandro Amari
(74) *Attorney, Agent, or Firm*—Oblon, Spivak, McClelland, Maier & Neustadt, P.C.

(57) ABSTRACT

An optical device for a system presenting collimated images through an off-axis spherical concave mirror. An image can be presented to a user with correction of eccentric distortion caused by the off-axis spherical concave mirror without altering the quality of the image. A diffractive mirror is set in the neighborhood of an intermediate image, and preferably a second intermediate image. The extent of the neighborhood is limited by image resolution and, in the neighborhood, the correction by the diffractive mirror does not alter the resolution. The diffractive mirror may include a hologram which may be digital or made of a photosensitive material. A hologram substrate is preferably not planar to operate partly upon the correction, the residual correction being carried out by the hologram. Such a device may find application to an aircraft pilot's visor.

12 Claims, 4 Drawing Sheets

OPTICAL DEVICE FOR HELMET VISOR COMPRISING A DIFFRACTIVE MIRROR

Figure 1:
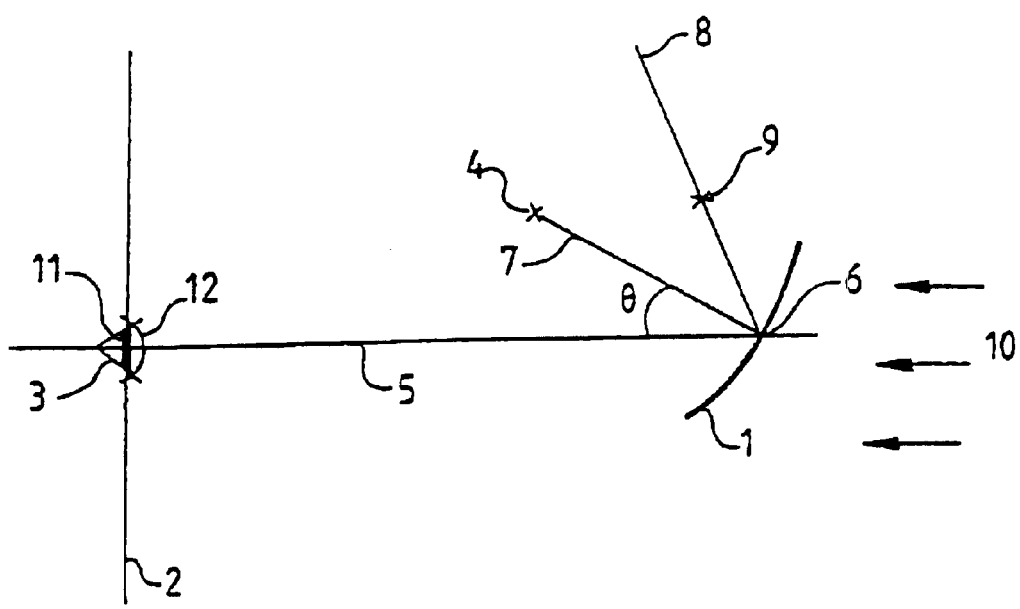

This application is a 371 of PCT/FR99/02378 filed Oct. 5, 1999.

The present invention relates to an optical device for the correction of aberrations affecting an image. In particular, a device according to the invention makes it possible to correct the distortion due to a spherical concave mirror that is inclined with respect to the direction at which this mirror is observed.

The invention can be applied to a helmet viewfinder for the pilot of a fighter aircraft or helicopter or for the operator of a training simulator.

A helmet viewfinder is an image-presenting device that is integrated into a helmet. The viewfinder enables the wearer of the helmet, for example a pilot of an aircraft in flight, to observe visual information simultaneously with the view of the landscape or of the pilot's cabin, which he perceives most usually through a protective visor. The presentation of appropriate information, for example in the form of symbols, provides piloting and navigation assistance. Thus, for armed vehicles, the presentation of a reticule provides assistance in the aiming of a weapon. The information may also consist of an image of the landscape acquired by sensors other than the eye of the helmet wearer such as infrared image sensors or light intensifiers to complement or replace direct viewing.

Inside the helmet, an image generator comprises an imager whose screen, for example a cathode-ray tube screen or a liquid crystal screen, enables an image to be displayed.

The image is most usually conveyed by a relaying optic up to a combiner which presents the conveyed image in a state where it is superimposed on the view of the landscape.

In order that the pilot may simultaneously observe the landscape viewed directly at infinity and the image from the imager, the latter image is also focused at infinity by a collimation optic.

When the combiner is formed by a simple semi-reflective plane plate, the collimation of the image can be achieved by an optic placed between the imager and the combiner; a prior art embodiment such as this has the major drawback of requiring a collimation optic that requires far too much space in relation to the restricted field of view that is obtained.

To reduce the space requirement, a combiner with optical power has been proposed; a combiner such as this provides its user with both the collimation of the image and the superimposition of the collimated image with the view of the landscape.

The prior art has a very extensive variety of devices comprising a combiner with optical power. Of more particular interest are image-presenting systems that comprise a spherical concave mirror to collimate the image.

A concave spherical mirror achieves an average quality collimation of an image placed at a particular point in space located on the axis of the mirror and at a distance from this mirror equal to half its radius of curvature. By placing an imager at this point, the eye located on the axis of the mirror receives rays coming from the imager after they are reflected on the spherical mirror. These rays are parallel and lead to the perception, by the eye, of a collimated image. If, furthermore, the mirror is semi-reflective, it enables the same eye to observe the landscape by transparency. However, in a device such as this, the imager would have to lie on the axis of the semi-transparent spherical mirror and it would conceal the user's field of view.

To clear the user's view, the spherical mirror is inclined with respect to the normal to his/her face and the user's eye is no longer on the axis of the mirror. This arrangement has the drawback of resulting in a collimated image that is affected by optical aberrations, especially off-centering aberrations, which need to be corrected, at least partially.

The inclination of the spherical concave mirror afflicts the collimated image with distortion, known as off-centering distortion of the second kind, characterized by a convergence of the verticals and an apparent curvature of the horizontals.

The prior art teaches us in order to correct the distortion of the image provided by the optical assembly to introduce an inverse distortion at the imager level by electronic correction; this is easily achieved when the imager comprises a cathode-ray tube but this solution is not suited to an imager, such as for example a light intensifier, which does not exhibit the necessary adjustments of the image. One could also attempt to correct the distortion by inserting into the optical path between the imager and the spherical mirror another inclined spherical mirror introducing distortion inverse to the first; however, one would end up with an unusable optical system owing to its bulkiness.

In a patent filed under U.S. Pat. No. 9,709,893 on Aug. 1st, 1997 by the present Applicant, an aspherical mirror with an adapted shape enables a correction of the off-centering distortion of the second kind.

The particular surface of the proposed aspherical mirror enables a modification of the light rays in order to rectify the effects of the spherical concave mirror on the horizontals and verticals of the image observed and thus ensure a correction of the distortion. This correction is achieved by the introduction through the aspherical mirror of an off-centering distortion of the second kind to compensate for the distortion of the same type due to the spherical concave collimating mirror used off-axis. The aspherical mirror has the effect of making the verticals parallel and the horizontals rectilinear in the collimated image. The image is rectified and orthoscopic but the overall shape of the mirror causes a local amplification of the aberrations, and especially of astigmatism. The correction of the distortion enabled by this invention is limited by a deterioration of the resolution of the image.

The problem is to construct a device for the presentation of images comprising an off-axis spherical collimating mirror presenting a collimated image that is satisfactory for the user, namely an image that is devoid of troublesome aberrations and has a wide field of view greater than or equal to 40 degrees. This entails obtaining a collimated image that has both high resolution and high correction of the distortion.

The spherical collimating mirror being observed at an oblique angle with respect to its axis, it introduces an off-centering distortion of the second kind characterized by an absence of symmetry of revolution. This distortion is especially dangerous for a user piloting a vehicle, since the perception of perspective is degraded. The difficulty consists in finding a means of correcting the distortion which does not degrade the quality of the image and is such that the entire optical device has restricted mass and restricted bulk.

This is why the invention proposes an optical device for a helmet viewfinder presenting a collimated image to a user, comprising an imager and an off-axis spherical concave mirror, characterized in that it comprises optical means for correcting the distortion of the image presented to the user which is due to the off-axis spherical concave mirror, said means comprising a diffractive field mirror.

The diffractive mirror comprises a reflection hologram. According to the invention, the correction of the distortion is effected when the diffractive mirror is placed in a vicinity of an intermediate image of the optical device: this is a diffractive field mirror. Its diffractive effect in proximity to the intermediate image makes it possible to displace the points of the image nonuniformly.

In the vicinity, the correction carried out by the diffractive mirror does not degrade the resolution of the image. The extent of the vicinity is limited by the resolution, which is imposed by the remainder of the device. The diffractive mirror is preferably situated at the limit of the vicinity fixed by the resolution. While being within the vicinity of the intermediate image, the diffractive mirror is placed a maximum distance from the intermediate image beyond which it degrades the resolution of the image presented to the user.

The diffractive mirror can be, for example, situated in the vicinity of the first intermediate image, that is to say that which is closest to the eye of the user of the device. However, it is preferably placed in the vicinity of the second intermediate image; this preferred arrangement allows the construction of a lighter and less bulky device in which the hologram is better protected.

The hologram in the invention is, for example, digital numerical with discrete variations, plane numerical with continuous profile, it may also be recorded in a photosensitive material.

The substrate in which the hologram is fashioned may be plane, but it is preferably not plane; the curvatures of the surface taking on board some of the correction, the hologram affording a residual correction.

The transparent substrate of the volume hologram in a photosensitive layer preferably exhibits a variable optical index or a variable thickness.

The device also comprises one or more optical power groups or optical relay groups placed in the path of the rays between the imager and the spherical mirror, upstream and/or downstream of the diffractive field mirror.

These optical groups also afford precorrection of the astigmatism necessarily introduced into the collimated image owing to the fact that the spherical mirror is observed at an inclined angle with respect to the ray which defines the optical axis of this mirror. This astigmatism can be corrected for example by a spherical convergent lens and a cylindrical lens, in an optical relay group situated between the imager and the diffractive mirror. It can also be corrected by a diffractive lens placed in a power group between the diffractive mirror and the spherical mirror.

The invention makes it possible to preserve an image of good resolution whilst affording a thorough correction of the distortion due to the spherical and inclined collimating mirror. The invention has the advantage of correcting the distortion of the image presented to the eye of the user for a wide instrument pupil, for example at least 15 millimeters in diameter, and for a wide field of typically greater than 40 degrees. The instrument pupil is the zone in space in which the user of an instrument must place the pupil of his eye in order to use it.

This correction is especially beneficial when a distortion cannot possibly or cannot easily be imposed at the level of the imager. Indeed, in such a case an electronic correction of the prior art is not suitable.

The first pupillary image of the device is inclined with respect to the optical axis, the diffractive mirror according to the invention gives a second, upright, pupillary image standing on the optical axis.

The invention can be incorporated into a helmet viewfinder exhibiting a wide instrument pupil and a wide field.

Figure 2:
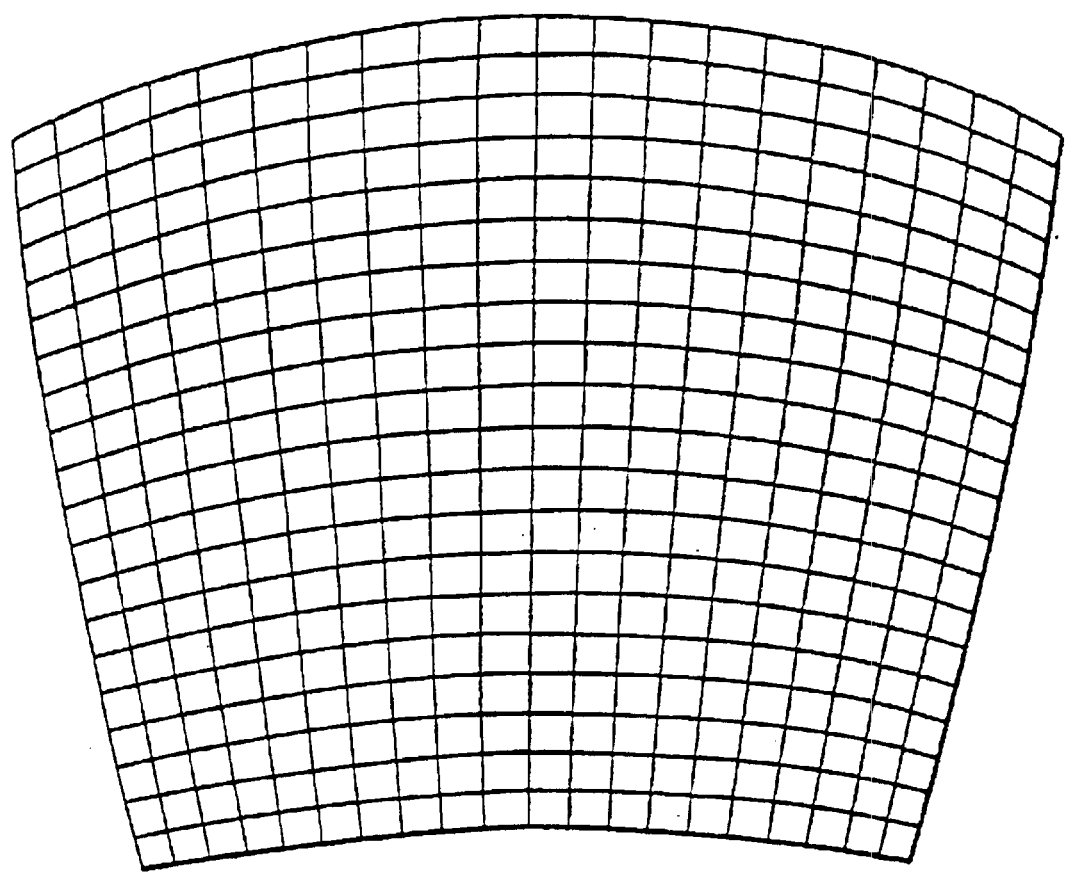
Figure 3:
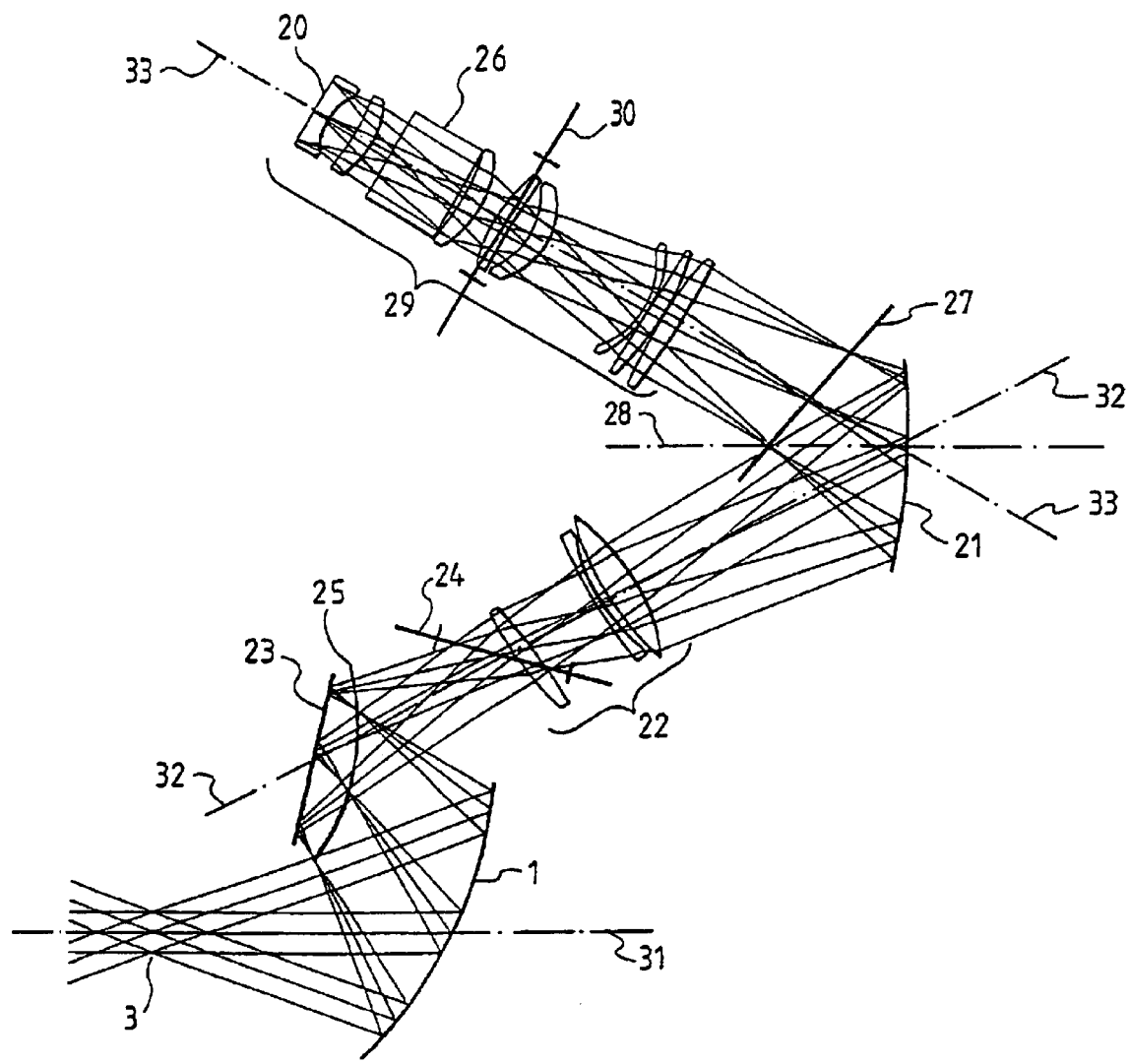
Figure 4:
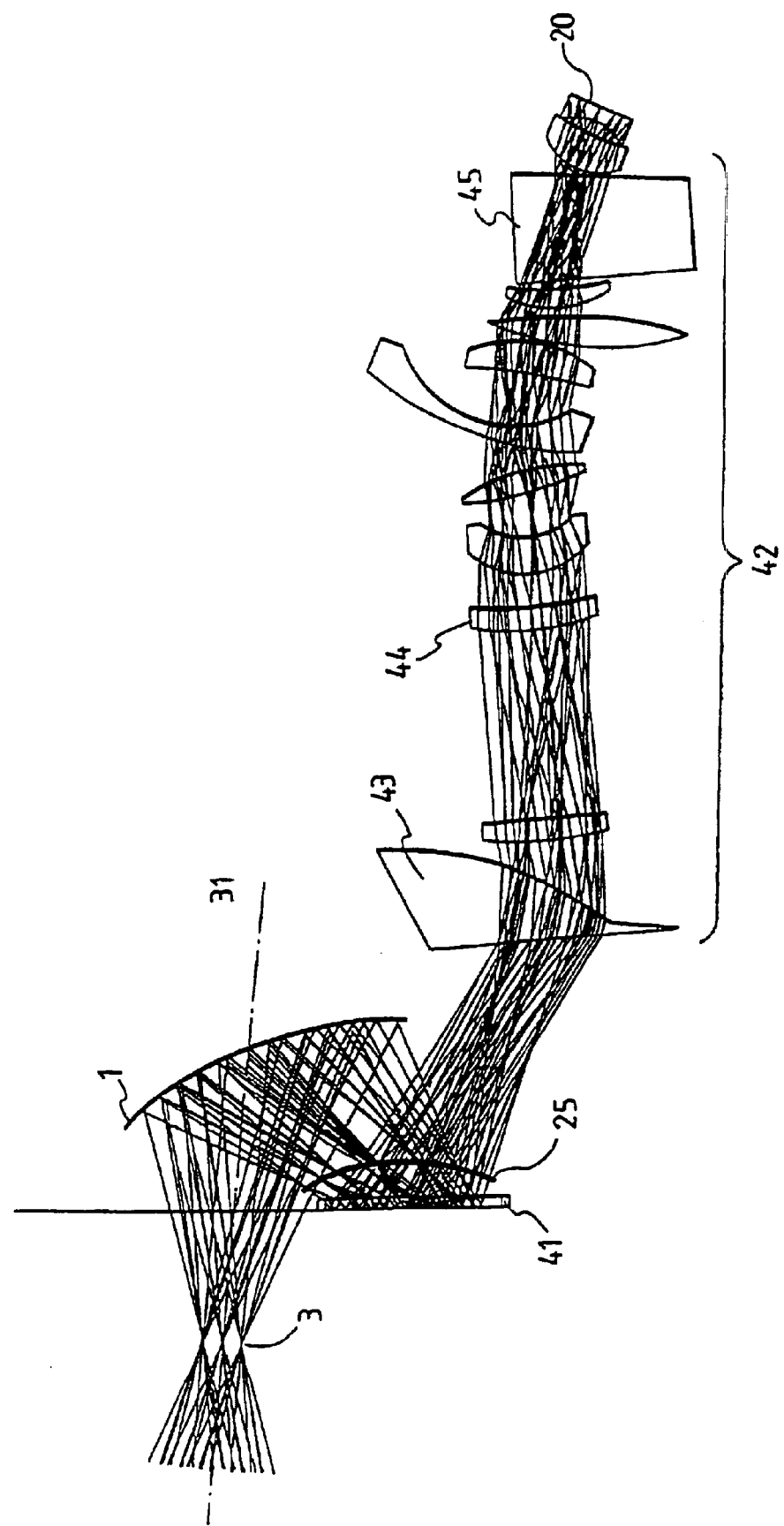

Other characteristics and advantages of the invention will become apparent on reading the following detailed description of particular embodiments which are given with reference to the following appended drawings:

FIG. 1 diagrammatically and partially represents an optical device with optical off-axis spherical combiner mirror, FIG. 2 represents the distortion corrected by the invention, FIG. 3 represents a preferred embodiment of a device according to the invention, FIG. 4 represents another embodiment of a device according to the invention.

In the drawings, the optical diagrams are represented developed in a plane referred to as the plane of symmetry of the optic. This plane contains the normal to the entrance pupil of the user's eye and the center of the sphere supporting the spherical mirror. In reality, mirrors (not represented) which introduce no aberration make it possible to direct beams in the three dimensions, so as to satisfy various bulkiness constraints: for example in order that the device should be matched to the contour of the user's head.

In FIG. 1, a user of an optical device comprising a spherical mirror 1 is represented by the plane of the pupils 2 and the straight line 5 normal to this plane 2. The pupil 11 of the eye is generally located, optically, three millimeters behind the cornea 12 of the eye 3.

It is noted that, depending on its orientation with respect to the user's face, the straight line 5 may correspond to the user's view straight ahead or else to an upward or downward view, a view toward one side or the opposite side.

The spherical mirror 1 is placed in front of the user. Its concavity is turned toward the user. The intersection of the observation axis 5 and the mirror 1 is designated by the reference 6.

The spherical mirror 1 is supported by a sphere S whose center 4 does not belong to this straight line 5. The plane P of FIG. 1 is a plane of the space that contains the center 4 of the supporting sphere of the spherical mirror 1 and the straight line 5 passing through the center of the pupil 11 of the eye 3. It is the plane of incidence of the straight line 5 on the spherical mirror 1, and it is called the plane of symmetry of the optic. Most usually, this plane is the same as the plane passing through the center of the pupil 11 and is parallel to the theoretical plane of symmetry of the user's face.

The straight line 5 and the radius 7 of the sphere S passing through the point of intersection 6 deviate from each other by an angle θ. A non-zero value of this angle θ characterizes an off-axis use of the spherical mirror 1. The spherical mirror 1 itself is said to be "off-axis".

Consider an optical ray 8 which is symmetrical with the straight line 5 of the optical axis with respect to the radius 7 of the sphere S. As a first approximation, an image whose center 9 is placed at a distance equal to half of the radius of curvature of the sphere S on this optical ray is perceived by the user's eye 3 as collimated to the first order since the light rays coming from the image thus placed are reflected by the spherical mirror 1 toward the eye 3 in the form of a beam of substantially parallel rays. The image with center 9 may have field curvature.

However, the collimation by reflection on the spherical mirror is not perfect. It is affected not only by aberrations intrinsic to this mirror but also by an off-centering optical aberration due to the off-axis use of the spherical mirror 1.

The spherical mirror 1 may be semi-transparent. In this case, light rays 10 coming from the environment external to the spherical mirror 1, namely striking the convex face of this mirror, are transmitted to the eye 3 by the spherical mirror 1. This spherical mirror 1 then affords a combiner which superimposes a collimated image on the direct view of the environment. This arrangement is generally adopted in a helmet viewfinder.

The central field is defined as the beam of the light rays coming from the center 9 of the image to be collimated. A particular light ray is considered which belongs to the central field and passes through the center of the user's pupil. The path of this light ray is the optical axis of the device used. The optical axis is generally a jagged line. The straight line 5 supports part of the optical axis. Most usually, the image is presented straight ahead of the user. The straight line 5 is then substantially normal to the user's face but the image may be for example presented at the top of the user's resting field of vision at infinity and the straight line 5 is then oriented in the corresponding direction.

FIG. 2 represents the image perceived by the eye of the user of an optical device according to FIG. 1 in which device an image centered on the point 9 and comprising a square with a regular square grid is collimated. The deformation perceived is an off-centering distortion of the second kind: the vertical lines which ought to be parallel straight lines are convergent and the horizontal lines which ought to be parallel straight lines are curved. This particular distortion is due to the inclination of the spherical collimating mirror with respect to the observation axis; it exhibits an absence of symmetry of revolution. When a pilot uses an optical device according to FIG. 1 to steer his vehicle, he is greatly disturbed by the deformation between the image presented and the actual landscape. Heights are overestimated and speeds are underestimated.

Various optical elements will be described according to the invention so that the user's eye can be made to perceive a high-quality collimated image, from a light image provided by an imager and collimated by an off-axis spherical mirror.

In FIG. 3, paths of light rays within a preffered embodiment of a device according to the invention are shown.

In this embodiment, intended for a helmet viewfinder, the imager, which is not shown, comprises a screen for example the screen of a cathode-ray tube or a liquid crystal screen. The screen may also be formed, for example, by a section of a bundle of optical fibers or a slide or the screen of a light intensifier tube. An image having any surface is displayed on the screen 20 of the imager represented by its tangent plane. The image provided by the imager may be plane, spherical or even have some other shape. The paths of the light rays from the screen 20 of the imager up to the user's eye 3 are plotted for this embodiment of the invention.

The device comprises a spherical mirror 1 placed in front of the eye 3 of the user and a diffractive field mirror 21 placed between the screen 20 and the spherical mirror 1. A diffractive mirror is a diffractive optic which works in reflection. The device also comprises a power group 22 between the diffractive field mirror 21 and the spherical mirror 1, as well as a relay optic 29 between the screen 20 and the diffractive field mirror 21.

The light rays emanating from the screen 20 of the imager are received, after having passed through the relay optic 29, by the diffractive mirror 21; they are reflected and deviated by the latter then pass through the power group 22 before striking the off-axis spherical mirror 1 which affords collimation of the image finally perceived by the eye 3 of the user.

The light rays emanating from the center of the screen 20 of the imager form the central field of the imager. The optical axis of the device corresponds to the path of the ray of the central field which passes through the center of the pupil of the user's eye 3.

It is now possible to observe the path of the light rays in the other direction, namely starting from the user's eye 3 and backtracking through the various optical elements toward the screen 20 of the display unit.

The rays coming from the eye are reflected on the off-axis spherical mirror 1 then form a first intermediate image 25. The image perceived by the eye is conjugated with the first intermediate image 25 by the spherical mirror 1. The optical axis which, in the example of FIG. 3, is horizontal on a first part 31 between the center of the pupil of the eye 3 and the spherical mirror 1 is also reflected on the spherical mirror 1.

This part 31 of the optical axis and its reflection on the spherical mirror 1 define a plane known as the plane of incidence of the optical axis on the off-axis spherical mirror 1. In the example of FIG. 3, the plane of incidence is the same as the plane of symmetry of the optic which is represented by the plane of FIG. 3. The plane of symmetry of the optic is a plane containing the path described by the optical axis between the imager and the user's pupil. However, an embodiment of the invention is not limited to an optic in this plane; in the context of the invention, it is always possible to add additional plane mirrors making it possible, for example, to take optical elements outside the plane of the figure. Indeed, the plane mirrors, which are also called folding mirrors, do not modify the optical function, they do not introduce and do not correct any aberration but they enable the optical rays to circumvent obstacles such as the user's head.

The rays reflected by the spherical mirror 1 strike, in this exemplary embodiment, a plane mirror 23 that enables the folding of the optical rays while preserving the plane of incidence of the optical axis on the spherical mirror 1. The invention may be embodied without this plane mirror 23. After reflection on the plane mirror 23, the optical axis is oriented along a straight line 32 of the plane of incidence.

On this second part 32 of the optical axis may be observed a first pupillary image 24 that is the image of the pupil 6f the eye 3 given by the off-axis spherical mirror 1.

The normal to the plane tangential to this first pupillary image 24 is not parallel to the corresponding section 32 of the optical axis. The first pupillary image 24 is inclined on the optical axis. This inclination is an effect of the distortion to be corrected.

The power group 22 is placed for example so that the first pupillary image 24 is in the path of the light rays between the spherical mirror 1 and the power group 22. The power group is preferably centered on the second part 32 of the optical axis. It comprises at least a convergent lens. Also, in the embodiment illustrated by FIG. 3, the power group comprises a divergent lens placed between a first and a second convergent lens; these successive lens each exhibiting restricted optical power limit the aberrations introduced by the power group 22 itself. The group 22 restricts the aperture of the beam incident on the diffractive mirror 21. This aperture is very small in comparison with the aperture with the beams incident on the spherical mirror 1.

The power group focuses the first intermediate image 25 on a second intermediate image 27. It affects the image and it enables the optical device according to the invention to exhibit high image quality. This power group is an optical element close to the first pupillary image 24; it hardly affects the latter.

The diffractive mirror 21 is placed in the vicinity of the second part 32 of the optical axis, the first pupillary image 24 is on one side of the power group 22 and the diffractive mirror 21 is on the other side. The diffractive mirror 21 reflects rays coming from the pupil of the eye toward the screen 20 of the imager. The plane of FIG. 3 is also the plane of incidence of the optical axis on the diffractive mirror 21.

The diffractive mirror 21 is close to the second intermediate image 27 which the device forms from the image displayed on the screen 20. At each of the points of its surface, the mirror 21 imposes a particular deviation on each light beam which it receives. Thus, by tracing back through the actual path of the light rays, a point of the image 27 is formed by rays which are reflected by the mirror 21 and also deviated by the diffractive capability of this mirror.

The local phase difference applied by the mirror 21 to the luminous wavefront is recorded in a hologram and the spacing of the interference fringes is proportional to the derivative of the phase function. The more tightly bunched are the fringes, the bigger is the deviation imposed on a light ray.

If the mirror is far from the image, which in this example is the second intermediate image 27, it imposes a global deformation of the image which does not correct the troublesome distortion. When the mirror 21 is in the vicinity of the image, the deviations displace the points of the image independently of one another. The proximity of the intermediate image makes it possible to separate the points of the field, the displacements of the points are not uniform and they allow a correction of the distortional deformation of the image. If the mirror 21 is very near the image 27, the distortion can only be corrected by large deviations; the phase function affording the correction then exhibits big fluctuations, it is difficult to control and to achieve. In the extreme, when the mirror 21 is exactly on the image, the deviation imposed by the mirror at each point of the image is zero.

In the invention, the hologram placed in the vicinity of the intermediate image 27 deviates a light ray of the image without modifying the local focusing: it shifts the position of a point in the image without modifying the quality of the image. The diffractive mirror 21 according to the invention affects the distortion of the image without affecting its resolution. The diffractive mirror 21 makes it possible to correct the distortion of the image introduced by the off-axis spherical collimating mirror 1 used.

In the invention, the mirror is preferably at a distance which corresponds for the center of the field to the limit of resolution of the image, the vicinity of the image is limited by this resolution-dependent distance. At the edge of the field, a lower resolution is tolerated.

The phase function of the hologram is calculated by projection on a reference base, preferably a polynomial base or a Zernike-type base. Such a projection affords a slowly variable phase function. The calculated coefficients are then recorded on a substrate.

The hologram is for example a reflecting digital hologram: the phase function is digitized and registered in a substrate in the form of a thickness variation of the substrate. The variation can be discrete as for example in a numerical plane digital hologram with discrete variations which can be obtained by etching the substrate through binary masks. The variation can be achieved in an analog manner, such as for example in a plane digital hologram with continuous profile, which is in particular made with variable-transmission masks.

The hologram is recorded on a substrate, for example glass; this may be a plate having plane and parallel faces but the surface is preferably not plane, this having the advantage of lessening the variations in incidence on the substrate and/or of achieving part of the optical function of the mirror 21.

The reflecting hologram can also be a volume hologram recorded in the photosensitive surface of a transparent support with the aid of a recording bench with the aid of two waves arriving on either side of a surface made in a photosensitive material such as for example a dichromated gelatine.

The transparent support of the sensitive surface may be a glass plate with plane and parallel faces. However, it can also exhibit a variable thickness, or exhibit a variable optical index dependent on the position on the surface of the substrate.

Thus, in the example of FIG. 3, the substrate is a spherical plate and the hologram carries out the residual correction which cannot be afforded by the spherical plate alone. In variant embodiments, the hologram according to the invention is supported for example by an aspherical surface or a Mangin mirror.

In the embodiment illustrated by FIG. 3, the position of the diffractive mirror 21 in the vicinity of the second intermediate image 27 enables the mirror to be placed fairly far from the user's eye. In particular, in a helmet viewfinder, the hologram is placed inside the helmet in a location protected from attack from, for example, moisture or contact with the pilot's fingers.

In FIG. 3, the third part 33 of the optical axis corresponds to the reflection of the second part 32 of this same optical axis on the diffractive mirror 21, and one observes thereat, between the diffractive mirror 21 and the screen of the imager 20, a second pupillary image 30 which exhibits a tangent plane substantially normal to the local optical axis 33. The diffractive mirror 21 transforms a pupillary image 24 inclined on the optical axis into a pupillary image 30 perpendicular to the optical axis. The diffractive mirror 21 enables the device according to the invention to exhibit good pupil quality without affecting the quality of the image.

The useful part of the diffractive mirror 21 exhibits a tangent plane whose normal 28, belonging to the plane of incidence, is not parallel to the second part 32 of the optical axis. The diffractive mirror 21 is inclined with respect to the optical axis, it is said to be off-axis. The aperture about the axis 28 is sufficient to optimize the extension left available for placing for example deviating mirrors between the diffractive mirror 21 and the closest lens in the power group 22. Additionally, the angle of incidence of the optical axis on the mirror 21 also makes it possible to limit the useful surface area and thus to preserve good image quality over the entire surface. The angle of incidence is preferably around 45 degrees. In this embodiment, the useful surface area of the mirror 21 is for example estimated via a diameter of around 45 millimeters.

The optical device according to the invention illustrated by FIG. 3 comprises a relay optic 29, placed between the diffractive mirror 21 and the screen 20 of the imager, for distancing the screen 20 of the imager from the diffractive mirror 21. This distancing is generally made necessary in order to satisfy bulkiness constraints. For a helmet viewfinder, it makes it possible for example to place the entire imager, which may be a cathode-ray tube, at a satisfactory position in the available volume of the helmet. The beams of the light rays between the relay optic 29 and the diffractive mirror 21 exhibit a very small aperture. These beams are downstream of the diffractive mirror 21 when considering the inverted beam paths, that is to say from the eye to the imager. The aperture is very small in comparison with that of the beams on the spherical mirror 1.

The relay optic 29 is substantially aligned with the third part 33 of the optical axis. This essentially centered relay optic is simple to produce.

The relay optic 29 also has optical power functions for precorrecting in proximity to the imager the astigmatism which will be introduced by the off-axis observation of the spherical mirror 1. In a variant embodiment, this correction of the astigmatism is not carried out at the level of the relay optic 29 but in the power group 22, which then comprises for example a diffractive lens and a convergent lens.

In the embodiment of FIG. 3, the relay optic 29 also comprises a mixer cube 26, or a semi-reflecting plate, which allows the mixing of the pathway of the screen 20 with a pathway of another display unit not represented in FIG. 3. The cube 26 makes it possible for example to superimpose visual information from a cathode-ray tube with that emanating from an assembly (not represented) comprising a picture-taking objective and an image intensifier.

Moreover, the enlargement between the two pupillary images 30 and 24 is preferably by a value close to one. The almost unitary pupillary conjugation has the advantage of reducing the bulkiness of the optical device, it allows minimization of the size of the optics along the entire optical path. This reduction in bulkiness is advantageous for the weight of the device and for its cost.

In the embodiment of FIG. 4, the optical device comprises, between an inclined spherical collimating mirror 1 and the screen 20 of the imager, a diffractive mirror 41 placed in proximity to the first intermediate image 25. The substrate of the hologram is for example a plane glass plate with parallel faces. Between the diffractive mirror 41 and the screen 20, the optical assembly 42 affords conjugation of the intermediate image 25 on the screen 20, it comprises several lenses, two of which are spherical lenses 43, 44. The assembly 42 can also comprise a mixer cube 45 associated with another light source.

However, for comparable optical performance, this embodiment of the invention requires a heavier and more expensive optical assembly than the preferred embodiment illustrated by FIG. 3.

The off-axis spherical mirror 1 may be semi-transparent. In this case, the light rays emitted by the landscape or the environment in the field of view of the user are transmitted by this mirror and are received by the pupil of the eye simultaneously with the rays that are reflected by this same mirror and have been described hereinabove. The semi-transparent mirror is a combiner. It is therefore a spherical combiner used off-axis.

The combiner preferably forms part of a visor for the protection of the eyes and even the face of the user.

A visor according to the invention has at least one off-axis spherical reflecting part. In the position of use, the visor is lowered so that the part corresponding to the spherical mirror 1 is placed in front of the user's eye. The entire device for presenting collimated images may be integrated into a helmet for example, for an aircraft or helicopter pilot, and enables the making of a helmet viewfinder.

The viewfinder may be monocular if it presents the collimated image to one eye only. The viewfinder may be binocular if it presents an image for each eye. It has the advantage of providing for pleasant vision when the overlapping of the fields of view of the two images is total. A binocular viewfinder may also present a partial overlapping of the two fields of view. This makes it possible, for one and the same dimensioning of the optics, to obtain a wider field of view without causing excessive deterioration in the perception of the information presented.

The distortion of an image having a grid leads to the deformation of the grid. The images presented to the user, in which the distortion inherent to the off-axis spherical concave visor is corrected, are particularly advantageous for a helmet viewfinder for they conform to the actual dimensions of the objects represented. This is paramount when the viewfinder presents an image superimposed on the direct view and is even more so when the image presented replaces the direct view for the user, for example in the case of night vision assisted by an image intensifier, of infrared vision or of a training simulator. The correction of this distortion has the advantage of allowing the user a good assessment of the distances on the image which he is observing and of allowing him for example to pilot at night without any positioning error.

What is claimed is:

1. An optical device for a helmet viewfinder presenting a collimated image to a user, comprising:

an imager configured to form an image;

a diffractive field mirror; and an off-axis spherical concave mirror, wherein a first intermediate image is formed between said diffractive field mirror and said off-axis spherical concave mirror, said diffractive field mirror is configured to correct an image distortion caused by the off-axis spherical concave mirror, said image distortion being an off-centering distortion of the second kind corresponding to an absence of symmetry of revolution caused by the spherical concave mirror being viewed at an oblique angle with respect to an axis thereof, and a second intermediate image is formed in a vicinity of said diffractive field mirror, the vicinity having an extent limited to a maximum distance of the image beyond which resolution of the image at a center of a field of the device is degraded.

2. The device as claimed in claim 1, wherein the diffractive mirror is placed at said maximum distance from the second intermediate image.

3. The device as claimed in claim 1, wherein the diffractive field mirror is a digital plane numerical hologram with discrete variations.

4. The device as claimed in claim 3, wherein a face of a support of the diffractive field mirror in which the hologram is made is not planar.

5. The device as claimed in claim 1, wherein the diffractive field mirror is a plane numerical hologram with a continuous profile.

6. The device as claimed in claim 1, wherein the diffractive field mirror is a volume hologram recorded in a photosensitive material.

7. The device as claimed in claim 6, wherein the photosensitive material is on a transparent support of variable optical index.

8. The device as claimed in claim 6, wherein the photosensitive material is on a transparent support of variable thickness.

9. The device as claimed in claim 1, further comprising a power group placed between the spherical mirror and the diffractive field mirror.

10. The device as claimed in claim 1, further comprising one or more optical power groups or optical relay groups placed in a path of rays between the imager and the spherical mirror, upstream and/or downstream of the diffractive mirror, the one or more optical power groups comprising one or more lenses, at least one lens of which is convergent so as to give an aperture of the beams incident on the diffractive mirror which is smaller in comparison with an aperture of the beams incident on the spherical mirror.

11. The device as claimed in claim 1, wherein the spherical mirror is semi-transparent.

12. The device as claimed in claim 1, wherein the diffractive field mirror is disposed so as to be antiparallel with the second intermediate image.

* * * * *

UNITED STATES PATENT AND TRADEMARK OFFICE
CERTIFICATE OF CORRECTION

PATENT NO. : 6,788,442 B1
DATED : September 7, 2004
INVENTOR(S) : Potin et al.

It is certified that error appears in the above-identified patent and that said Letters Patent is hereby corrected as shown below:

<u>Title page</u>,
Item [73], Assignee, should read:
-- [73] Assignee: Thomson-CSF Sextant, Velizy
                      Villacoublay (FR) --

Signed and Sealed this

Fourteenth Day of December, 2004

JON W. DUDAS
*Director of the United States Patent and Trademark Office*